Feb. 17, 1931.   H. M. SALISBURY ET AL   1,792,764
AUXILIARY LIFTING WING FOR AEROPLANES
Filed Dec. 29, 1928    4 Sheets-Sheet 2
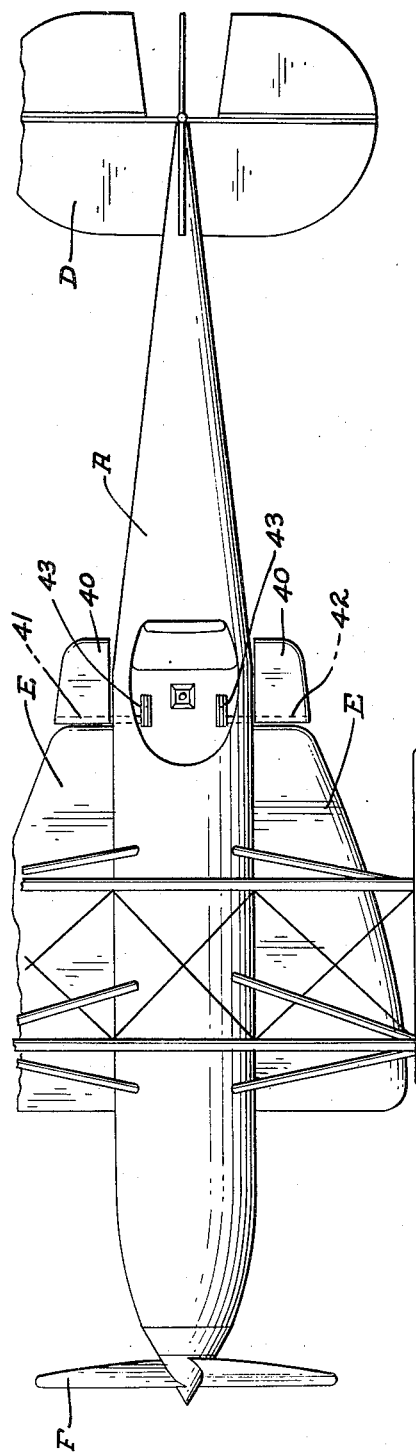
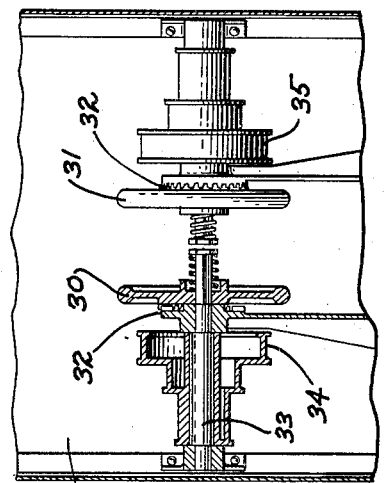
INVENTORS.
Hervey M. Salisbury,
Arthur E. Miller.
BY Townsend, Loftus & Abhett
ATTORNEYS.

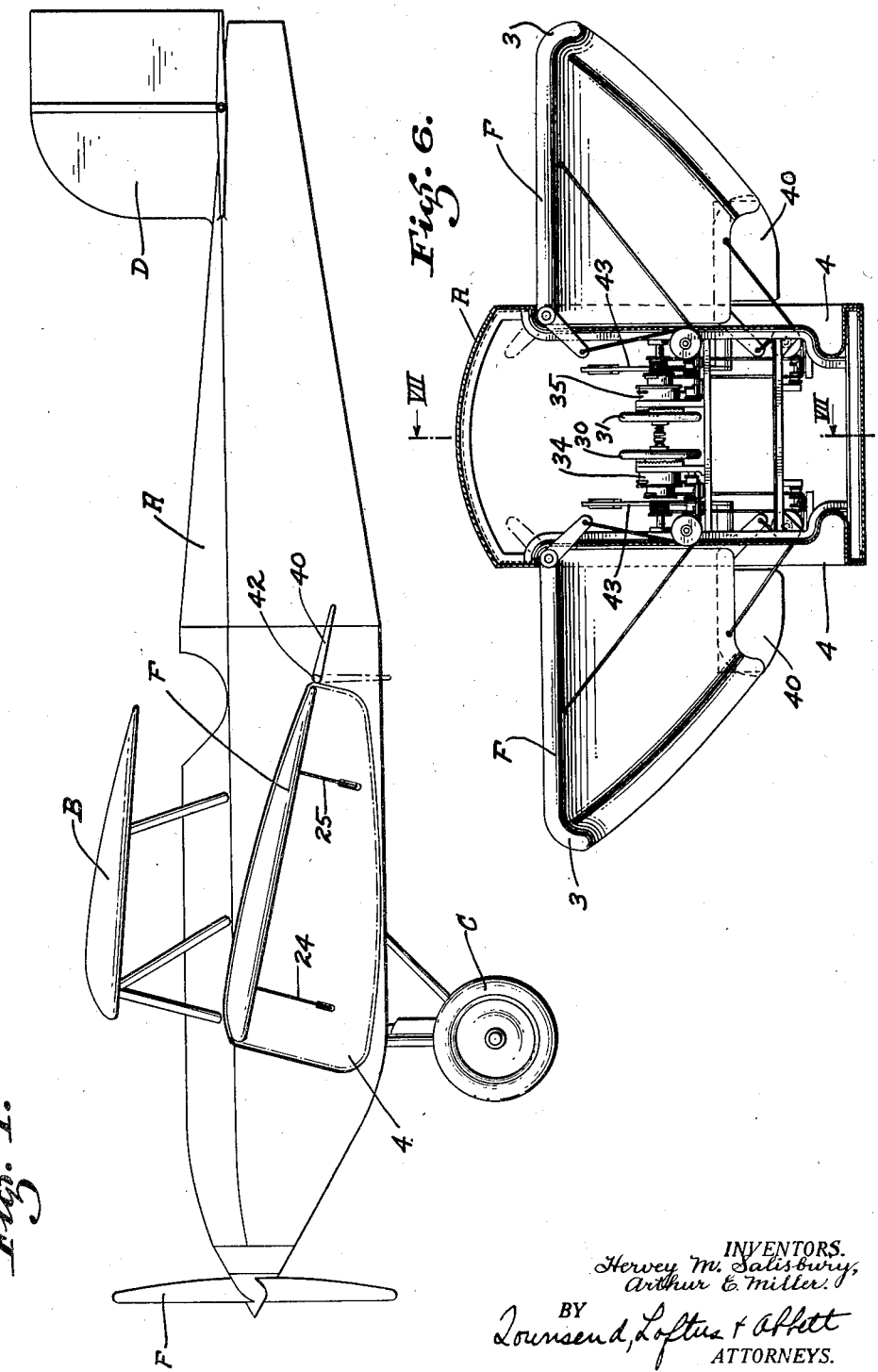

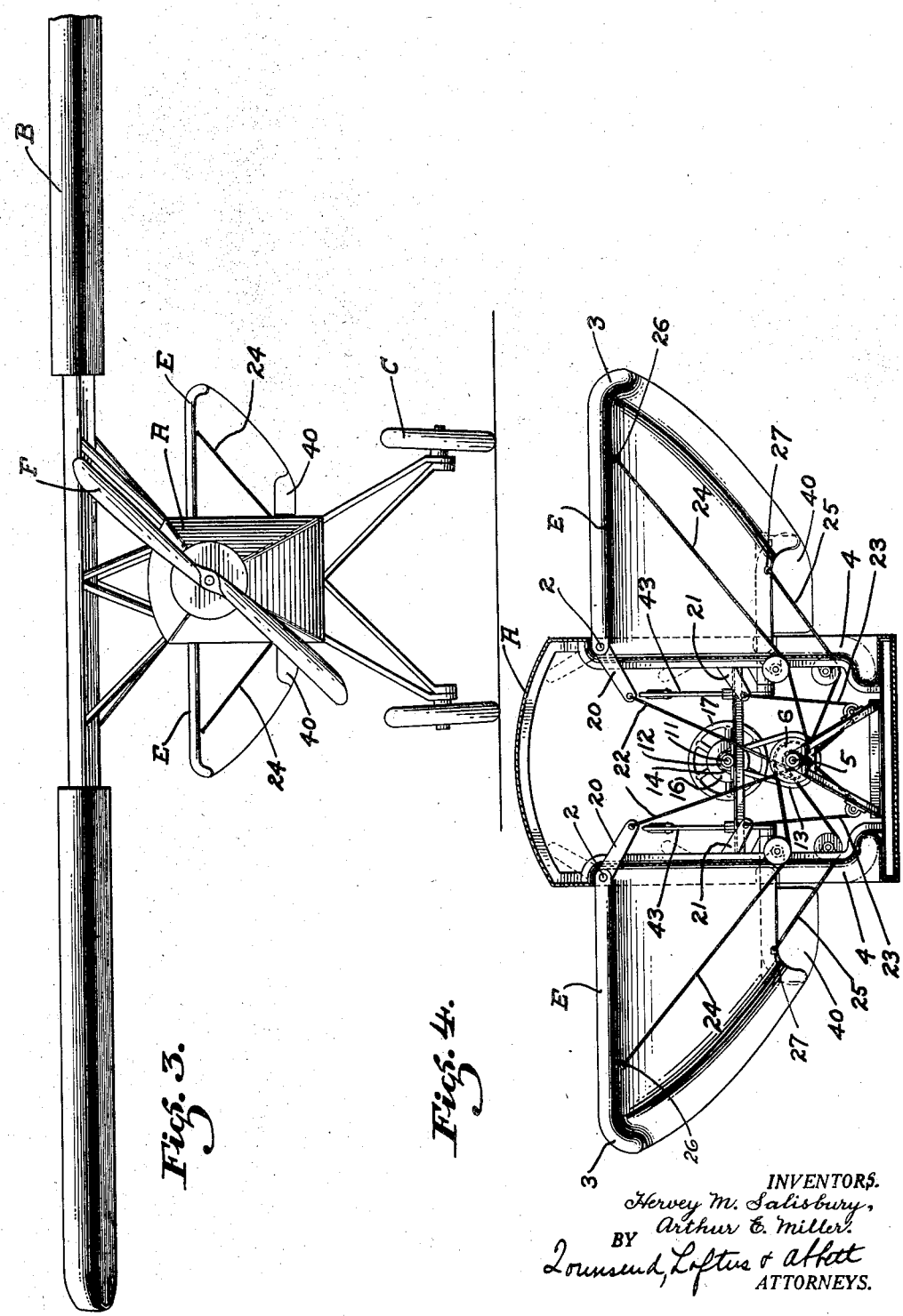

Feb. 17, 1931. H. M. SALISBURY ET AL 1,792,764
AUXILIARY LIFTING WING FOR AEROPLANES
Filed Dec. 29, 1928 4 Sheets-Sheet 4
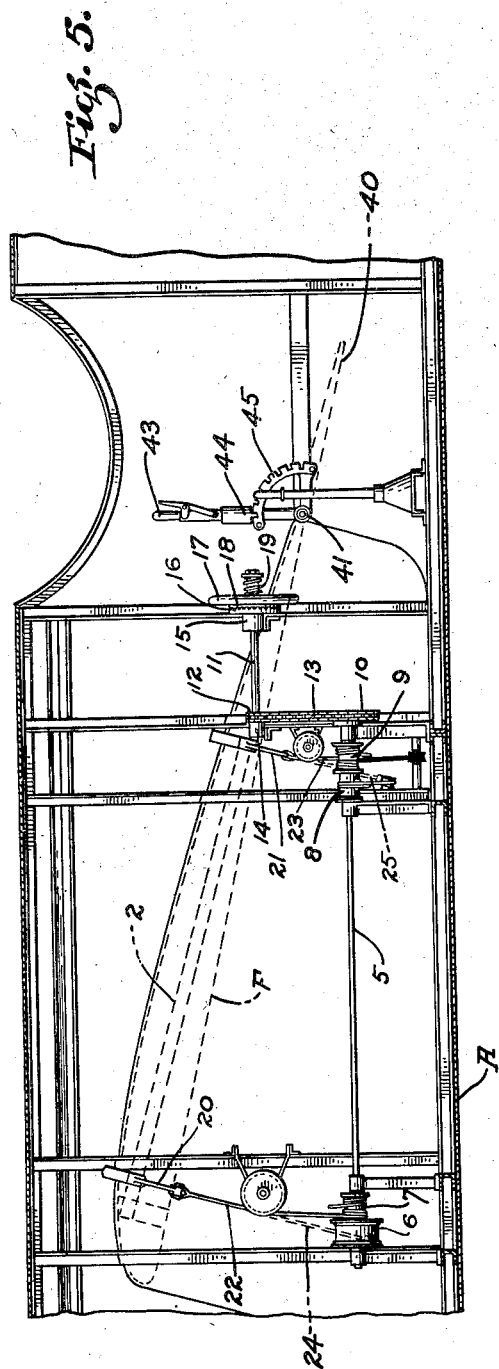
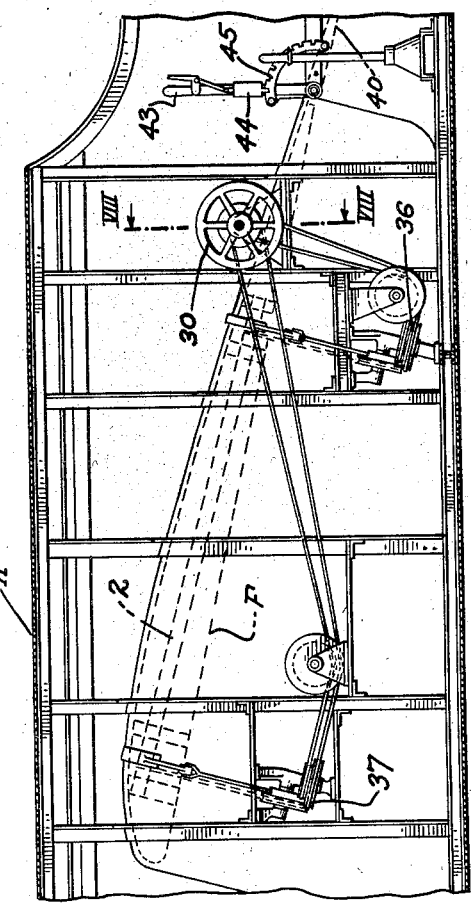
INVENTORS.
*Hervey M. Salisbury,
Arthur E. Miller.*
BY *Townsend, Loftus & Abbett*
ATTORNEYS.

Patented Feb. 17, 1931

1,792,764

UNITED STATES PATENT OFFICE

HERVEY M. SALISBURY, OF WALNUT GROVE, AND ARTHUR E. MILLER, OF SACRAMENTO, CALIFORNIA

AUXILIARY LIFTING WING FOR AEROPLANES

Application filed December 29, 1928. Serial No. 329,278.

This invention relates to improvements in aeroplane construction, and especially to the application of auxiliary lifting wings therefor.

Aeroplanes, as ordinarily constructed, operate under numerous disadvantages, but for the purpose of the present invention only two of the more important will be referred to. First, high landing speed, and second, high speed when taking off the ground.

An aeroplane, when traveling at a high rate of speed, requires a comparatively small wing surface and when high speed is desirable, a small wing surface is employed. A small wing surface, however, necessitates a high landing speed and a long runway for landing, and when taking off a long runway is also necessary as the plane must reach a high speed to enable it to leave the ground.

The object of the present invention is to generally improve the operation of aeroplanes, first by enabling the plane to land at a lower rate of speed, second by enabling the plane to rise more rapidly on the take off, and third by enabling the plane to operate at a higher speed when in flight. The invention, more specifically stated, embodies a pair of auxiliary lifting wings or other supporting surfaces which are used in taking off and landing, which may be moved out of the air stream when in flight to insure higher speed, and further in providing a second set of auxiliary wings which may function either as ailerons or as brakes when landing. The auxiliary lifting wings and the mechanism controlling and operating the same are shown by way of illustration in the accompanying drawings in which:

Fig. 1 is a side elevation of an aeroplane showing the application of the invention, Fig. 2 is a partial plan view of the plane shown in Fig. 1, Fig. 3 is a front view of the plane shown in Fig. 1, Fig. 4 is a cross section of the fuselage showing the mechanism whereby the auxiliary wings are controlled, Fig. 5 is a longitudinal section of a portion of the fuselage showing the mechanism whereby the auxiliary wings are controlled, Fig. 6 is a cross section of the fuselage showing a modified form of mechanism for controlling the auxiliary lifting wings, Fig. 7 is a longitudinal section of a portion of the fuselage taken on line VII—VII, Fig. 8 is an enlarged cross section taken on line VIII—VIII of Fig. 7.

Referring to the drawings in detail, particularly to Figs. 1, 2, 3 and 4, it will be noted that an aeroplane of the monoplane type is illustrated. In these drawings A indicates the fuselage, B the main wings or planes, C the running gear, D the rudder, E the propeller and F the auxiliary lifting wings. These wings are perhaps best illustrated in Figs. 4 and 5. It will there be noted that the wings are secured at their inner ends to shafts 2 which are suitably journalled in opposite sides of the fuselage. The wings are inclined so that their forward edges assume a higher position than the trailing edges, and it is accordingly necessary to place the shafts 2 on an inclined plane with relation to a horizontal line drawn through the fuselage, this being clearly shown in Fig. 5.

The auxiliary lifting wings may be constructed in any suitable manner, but they present a large area at their forward-leading edges and a smaller area at their trailing edges. That is, the wings are wider at the front than at the rear and the outer edges of the wings are bent downwardly or curved as shown at 3, and as such tend to pocket and direct the air towards the trailing edges. Pockets such as indicated at 4 are formed on opposite sides of the fuselage and the wings are adapted to be folded into these pockets when the plane is in flight and higher speed is desired. Also they may be folded into the pockets when the wings are not in use.

Extending longitudinally of the fuselage and substantially central thereof is a shaft 5, at opposite ends of which are mounted pulleys 6, 7, 8 and 9. Secured on one of the shaft is a comparatively large sprocket gear 10 and disposed above the shaft 5 is a control shaft 11 on which is secured a small sprocket gear 12, the gears 10 and 12 being connected by a chain 13. The control shaft is supported on bearings 14 and 15, and the bearing 15 is provided with a stationary jaw clutch face 16. The outer end of the shaft is square and a hand wheel 17 having a jaw clutch 18 on its inner face is slidable on the square end of the shaft. The clutch members 16 and 18 are normally held in engagement by a spring 19 which engages the outer face of the hand wheel. Secured at opposite ends of the shaft 2 are crank arms 20 and 21. Secured to the inner ends of the crank arms are cables 22 and 23, the cable 22 being secured at its opposite end to the drum 7, while the cable 23 is secured at its opposite end to the drum 9. Secured to the drums 6 and 8 are cables 24 and 25. The outer ends of these cables are in turn secured to the outer ends of the auxiliary lifting wings at the points indicated at 26 and 27. The cables 22 and 23 are wound about the drums in one direction while the cables 24 and 25 are wound about the other drums in the opposite direction. Hence, when a turning movement is transmitted to the shaft 5 through means of the hand wheel 17, the control shaft 11 and the sprocket chain 13, a pull will be exerted on the cables 24 and 25 to pull the wings inwardly against the fuselage and the cables 22 and 23 will pay out so as to permit the cranks to swing to the dotted line position shown in Fig. 4. Conversely when shaft 5 is rotated in the opposite direction by means of the hand wheel 17, cables 24 and 25 will pay out while a pull will be exerted on the cables 22 and 23 and the wings will thus be extended.

In actual practice it will be noted that the auxiliary lifting wings E are attached to opposite sides of the fuselage at a point just rearwardly of the propeller. This is important as it is desired to utilize the rearwardly directed blast of the propeller to increase the lifting capacity of the plane when taking off. Hence, when it is desired to take off, the wings E are extended as shown in Fig. 3, the blast of the propeller is then directed under and over the wings and due to the added lifting capacity thus procured it is possible for the plane to take off the ground at a comparatively slow speed. This is not only advantageous when it is considered that a comparatively short runway may be employed, but it is also advantageous as it permits the plane to take off with a larger load.

After the plane has taken off and picks up speed it is possible to materially increase the speed by removing the auxiliary wings from the air stream. This is accomplished, as previously stated, by rotating the shaft 5 in one direction. The lifting wings are thus swung about their pivot shafts 2 and folded into the pockets 4 of the fuselage. When so withdrawn head resistance is materially reduced and the speed of the plane proportionately increased.

When landing, the wings are again extended and as the lifting capacity is materially increased by the additional wing surface provided, it is obvious that the landing speed may be materially reduced. The exact position which the auxiliary wings E should assume to obtain maximum lifting capacity can be determined by experiment. It is for this reason that the hand wheel 17 is provided with the jaw clutch 18. That is, the hand wheel 17 is grasped and pulled rearwardly when it is desired to extend or retract the auxiliary lifting wings, but when the desired position is assumed, the hand wheel is merely released and when so released it is pushed forward into engagement with the jaw clutch by means of the spring 19 and locked, thereby locking the wings in any adjusted position. The operation is therefore comparatively simple and the wings may be extended or folded in a comparatively short period of time.

In order that the landing speed may be further reduced a second pair of auxiliary wings may be employed, as indicated at 40. These wings are secured to respective shafts 41 and 42 extending crosswise of the fuselage and at a point rearwardly of the auxiliary wings E. Each shaft is provided with a lever 43, and each lever is provided with a locking pawl 44 cooperating with a toothed segmental rack 45. By grasping both levers and pulling them both rearwardly in unison, both of the wings 40 are swung from a substantially horizontal position to a vertical position wherein they will function as brakes by presenting a comparatively large vertical area which resists forward motion, and also by pocketing the air passing under the auxiliary wings E. Conversely by swinging the levers upwardly the secondary wings may be swung to a horizontal, or any intermediate position, where they will form a substantial continuation of the wings E, and thereby proportionately increase the supporting area thereof.

The wings 40 are adapted to operate in unison or independently of each other, as separate controlling levers are provided, hence they may also function as ailerons. It should be assumed that the wings 40 will assume a substantially horizontal position when the plane is in flight so as to reduce head resistance to a minimum. It should also be understood that the wings E will be folded during flight, as it is then desirable to reduce the supporting area and head resistance to a minimum to insure the greatest speed. On the other hand, when making a landing, supporting area and head resistance should be increased to a maximum as it is under these conditions that the landing speed may be materially reduced.

In some instances it may be desirable to provide independent controls for each auxiliary lifting wing. Such a control is shown in Figs. 6, 7 and 8. In this instance, hand wheels are employed, as indicated at 30 and 31. These wheels are provided with a jaw clutch, such as shown at 32 and either wheel may thus be locked or released by moving it away from the clutch. Each hand wheel rotates a control shaft, such as shown at 33, and each shaft is provided with drums, such as shown at 34 to which the several control cables are attached. That is, the cables are attached to the inner crank arms and to the outer ends of the wings in a manner similar to that shown in Fig. 4, but as the two control shafts are employed, one set of cables will be directed to the drums 34 and another set of cables to the drums indicated at 35, and it will also be necessary to employ directing sheaves or pulleys, such as shown at 36 and 37. The mechanism is otherwise substantially identical, but one advantage is obtained, to wit, that of permitting independent movement of either of the auxiliary lifting wings. This is advantageous in some instances, as lateral stability may be materially improved by such control.

While certain features of the present invention are more or less specifically described, we wish it understood that various changes may be resorted to within the scope of the appended claims, similarly, that the materials and finishes of the several parts employed may be such as the manufacturer may decide or varying conditions or uses may demand.

Having thus described our invention, what we claim and desire to secure by Letters Patent is:

1. In an aeroplane a fuselage, main lifting wings attached thereto, a propeller at the forward end of the fuselage, a pair of auxiliary lifting wings pivotally attached at their inner ends to the fuselage one on each side thereof at a point rearwardly of the propeller, means whereby the auxiliary wings may be swung in unison or independently of each other to assume a vertical position against the sides of the fuselage or swung to assume a substantially horizontal position, and means for securing the wings against movement in any position assumed.

2. In an aeroplane a fuselage, main lifting wings attached thereto, a propeller at the forward end of the fuselage, a pair of shafts extending longitudinally of the fuselage one on each side thereof, journal members supporting the shafts, a pair of auxiliary lifting wings, one on each side of the fuselage, said wings being secured at their inner ends to the respective shafts, said fuselage having a pocket formed in each side thereof for the reception of the wings, means for transmitting a rotary movement to the shafts to swing the wings outwardly from the pockets to assume a position substantially parallel to the main lifting wings, said means adapted to transmit a reverse rotary movement to the shafts to return the wings to the pockets, and means for securing the wings against movement in either position.

3. In an aeroplane a fuselage, main lifting wings attached thereto, a propeller at the forward end of the fuselage, a pair of shafts extending longitudinally of the fuselage one on each side thereof, journal members supporting the shafts, a pair of auxiliary lifting wings, one on each side of the fuselage, said wings being secured at their inner ends to the respective shafts, said fuselage having a pocket formed in each side thereof for the reception of the wings, a pair of crank arms secured to each shaft, a third shaft journalled in the fuselage and extending longitudinally thereof, a plurality of drums secured on said shaft, cables connecting the crank arms with certain drums, a second set of cables secured to the wings adjacent their outer ends, said cables connected at their inner ends to the other drums, manually controlled means for transmitting rotary movements to the third shaft and the drums carried thereby in one direction or another, to swing the wings outwardly or inwardly with relation to the pockets and means for locking said third shaft and drums carried thereby against rotation.

4. In an aeroplane a fuselage, main lifting wings attached thereto, a propeller at the forward end of the fuselage, a pair of auxiliary lifting wings pivotally attached at their inner ends to the fuselage one on each side thereof at a point rearwardly of the propeller, means whereby the auxiliary wings may be swung to assume a vertical position against the sides of the fuselage or swung to assume a substantially horizontal position, a second set of auxiliary wings disposed rearwardly of the first-named auxiliary wings and forming substantially a continuation thereof, and means whereby the second set of wings may be swung from a substantially horizontal position to a vertical position.

5. In an aeroplane a fuselage, main lifting wings attached thereto, a propeller at the forward end of the fuselage, a pair of auxiliary lifting wings pivotally attached at their inner ends to the fuselage one on each side thereof at a point rearwardly of the propeller, means whereby the auxiliary wings may be swung to assume a vertical position against the sides of the fuselage or swung to assume a substantially horizontal position, a second set of auxiliary wings disposed rearwardly of the first-named auxiliary wings and forming substantially a continuation thereof, and means whereby the second set of wings may be swung from a substantially horizontal position to a vertical position, in unison or independently of each other.

6. In an aeroplane a fuselage, main lifting wings attached thereto, a propeller at the forward end of the fuselage, a pair of auxiliary lifting wings pivotally attached at their inner ends to the fuselage one on each side thereof at a point rearwardly of the propeller, means whereby the auxiliary wings may be swung to assume a vertical position against the sides of the fuselage or swung to assume a substantially horizontal position, a second set of auxiliary wings disposed rearwardly of the first-named auxiliary wings and forming substantially a continuation thereof, means whereby the second set of wings may be swung from a substantially horizontal position to a vertical position in unison or independently of each other, and means for securing the wings against movement in either position or in any intermediate position.

7. In an aeroplane of the character described, a fuselage, a pair of main wings extended laterally therefrom, said wings having their effective surfaces removed adjacent the fuselage, whereby the portion of the air stream adjacent the fuselage will be ineffective, and a second pair of wings hingedly attached to the fuselage and capable of being extended outwardly to utilize said portion of the air stream adjacent the fuselage.

8. In an aeroplane of the character described, a fuselage, a pair of main wings extended laterally therefrom, said wings having their effective surfaces removed adjacent the fuselage, whereby the portion of the air stream adjacent the fuselage will be ineffective, and a second pair of wings hingedly attached to the fuselage and capable of being extended outwardly to utilize said portion of the air stream adjacent the fuselage, said wings being wider at the front than at the rear and having their outer edge bent downwardly to convey the air stream inwardly and under the fuselage.

9. In an aeroplane of the character described, a fuselage, a pair of main wings extended laterally therefrom, said wings having their effective surfaces removed adjacent the fuselage, whereby the portion of the air stream adjacent the fuselage will be ineffective, a second pair of wings hingedly attached to the fuselage and capable of being extended outwardly to utilize said portion of the air stream adjacent the fuselage, said wings being wider at the front than at the rear and having their outer edge bent downwardly to convey the air stream inwardly and under the fuselage, a flap hingedly secured to the rear end of said wings, and means for swinging the flaps from a horizontal to a vertical position or to any intermediate position.

HERVEY M. SALISBURY.
ARTHUR E. MILLER.